O. ERICKSON & O. G. SUNDEN.
RESILIENT TIRE FOR VEHICLE WHEELS.
APPLICATION FILED FEB. 17, 1912.
1,049,067.
Patented Dec. 31, 1912.
2 SHEETS—SHEET 2.
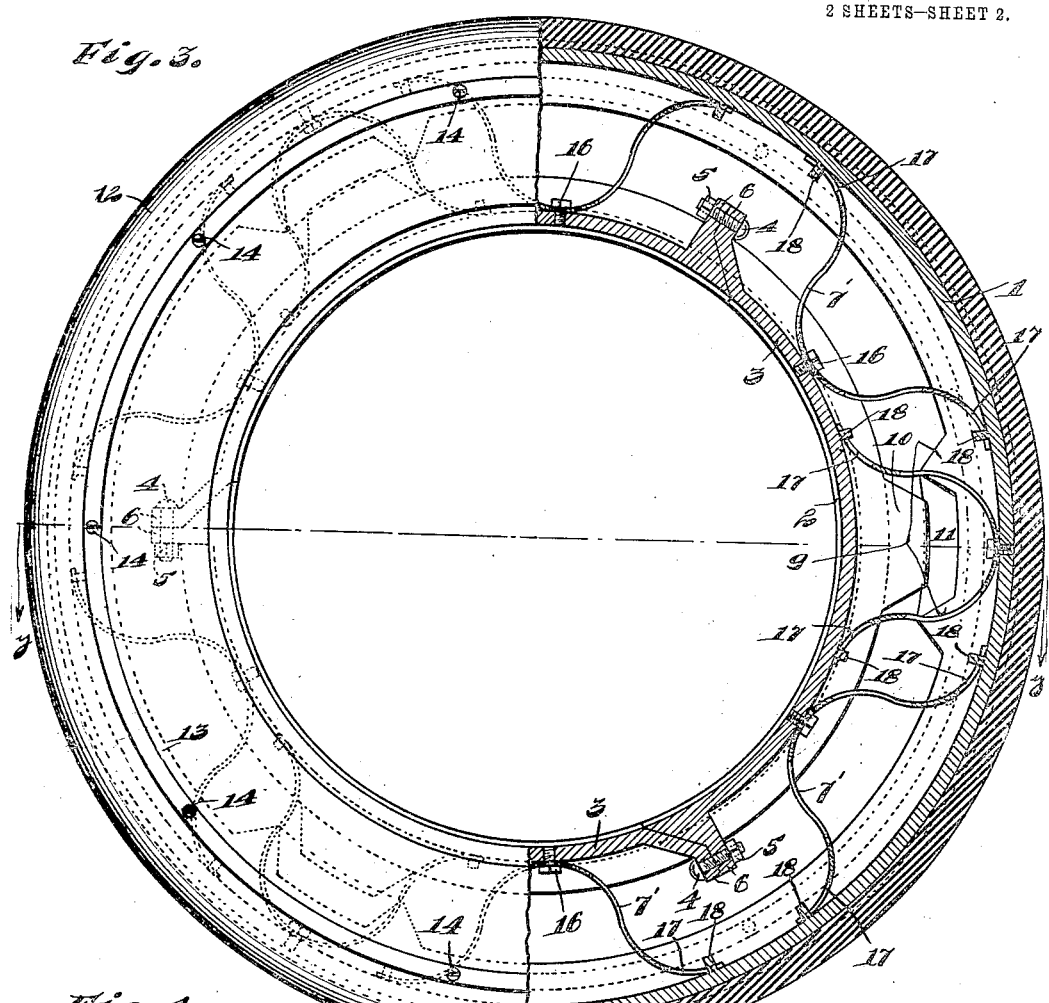
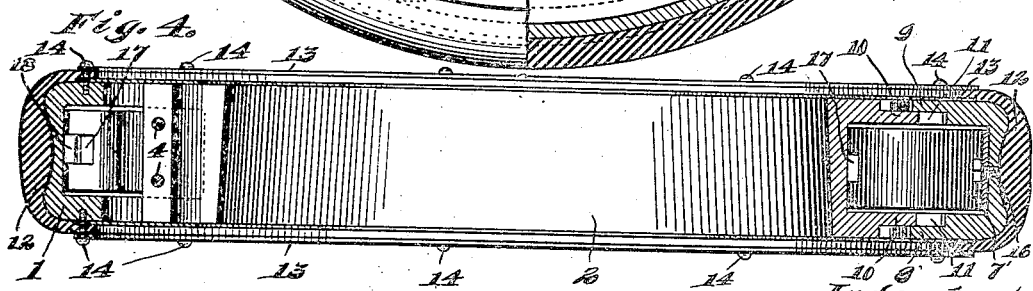
Witnesses:
E. E. Wessels.
A. A. Olson.
Inventors:
Otto Erickson,
And
Olof G. Sunden,
By Joshua R. H. Potts
their Attorney.

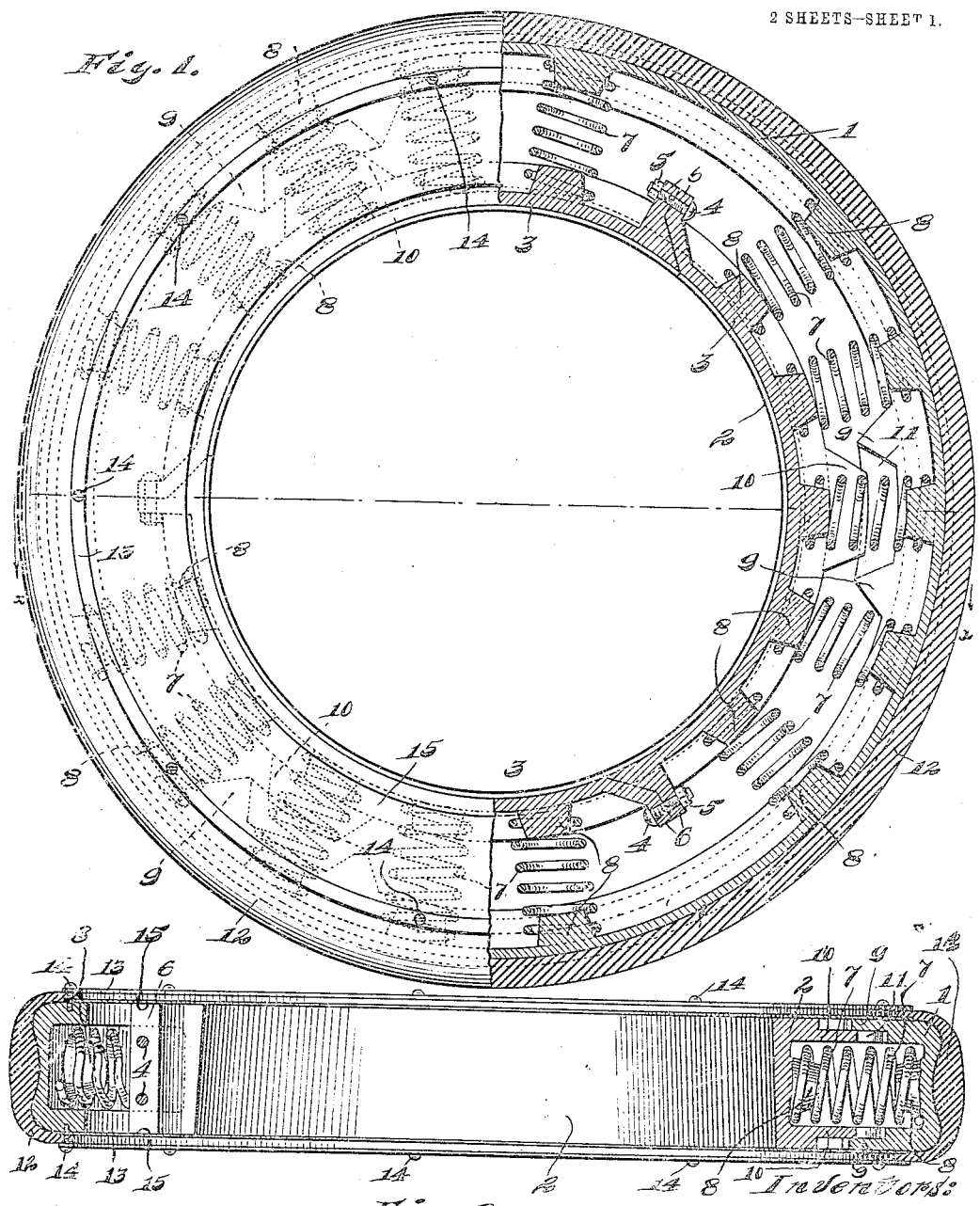

UNITED STATES PATENT OFFICE.

OTTO ERICKSON AND OLOF G. SUNDEN, OF CHICAGO, ILLINOIS.

RESILIENT TIRE FOR VEHICLE-WHEELS.

1,049,067. Specification of Letters Patent. Patented Dec. 31, 1912.

Application filed February 17, 1912. Serial No. 678,336.

*To all whom it may concern:*

Be it known that we, OTTO ERICKSON and OLOF G. SUNDEN, citizens of the United States, and residents of the city of Chicago, county of Cook, and State of Illinois, have invented certain new and useful Improvements in Resilient Tires for Vehicle-Wheels, of which the following is a specification.

Our invention relates to improvements in resilient tires for vehicle wheels, and has for its object the production of a resilient tire which will be of improved construction and efficient in operation.

Other objects will appear hereinafter.

With these objects in view, our invention consists in the combinations and arrangements of parts hereinafter described and claimed.

Our invention will be best understood by reference to the accompanying drawings forming a part of this specification, and in which—

Figure 1 is a sectional side elevation of a resilient tire for a vehicle wheel embodying our invention, Fig. 2 is a central transverse section taken on substantially line $x\ x$ of Fig. 1, Fig. 3 is a view similar to Fig. 1, showing a slightly modified form of our invention, and Fig. 4 is a central transverse section taken on substantially line $y\ y$ of Fig. 3.

The preferred form of construction, as illustrated in the Figs. 1 and 2 of the drawings, comprises outer and inner rings 1 and 2 respectively. The rings 1 and 2 are arranged concentric, the latter being of a diameter considerably less than that of the former so as to permit of relative radial movement of said rings which is required during operation of the tire, as will be hereinafter set forth. The ring 1 is preferably cast in a single piece, the same being of channel form in cross section, with the channel opening inwardly. The ring 2 is formed of a plurality of sections 3, the contiguous ends of adjacent sections 3 being secured together by screws 4 and nuts 5, said screws passing through perforated outwardly projecting lugs 6 formed at the extremities of said sections. The contiguous faces of adjacent sections are beveled or inclined, as shown, in order to facilitate the assemblage of the ring 2 during the construction of the rim. By forming the extremities of the ring sections 3 of inclined disposition or beveled, the same overlap each other, and during assemblage the outermost of the overlapping ends of adjacent sections will serve to hold the other or innermost of said ends in position preparatory to the insertion of the securing screws 4.

Interposed between the adjacent sides of the rings 1 and 2 are helical compression springs 7 which serve to yieldingly hold said rings normally in concentric position. The springs 7 are arranged at intervals, as will be observed, the same being positively held in operative position by means of tapering lugs 8 which project from the adjacent sides of the rings 1 and 2 into engagement with the respective extremities of said springs. Said lugs are formed tapering, as mentioned, in order to prevent buckling of the intermediate convolutions of the springs thereon during compression of said springs, it being clear that were said lugs of cylindrical form, there would be a likelihood of the convolutions of the springs buckling thereon or of the convolutions engaging upon the extremities of said lugs and thus interfering with the proper action thereof.

Formed at the lateral edges of the ring 1 at intervals, are inwardly projecting radially disposed ears 9 which overlap with outwardly projecting radially disposed ears 10 formed at the lateral edges of the ring 2, the outer extremities of the ears 10 slidably engaging against the inner sides of the ears 9, as clearly shown. Said ears are adapted, as will be readily understood, to maintain the rings 1 and 2 coplanar, permitting, however, of free relative radial movement of said rings. The inner sides of the ears 9 are formed with tapering recesses 11 which are engaged by the ears 10, said ears being correspondingly tapered. This provision will serve to prevent excess relative rotary movement of the rings, it being clear that upon relative rotary movement of one or the other of said rings, the extremities of the ears 10 will be brought into engagement with the corresponding extremities of the recesses 11 and serve to stop further relative rotation of said rings. The arrangement is such, as will be seen, that the engagement of the extremities of the ears 10 with the extremities of the recesses 11 will take place only upon excess relative rotary movement of said rings, slight relative rotation of the latter being permitted in order to obviate shocks to the vehicle body when the motor is suddenly thrown into operation. With the construction set forth, upon the motor being thrown into operation, the springs 7 will be flexed transversely to absorb the shock.

Arranged upon the periphery of the ring 1 is a resilient covering 12 preferably of rubber. The covering 12 is secured at its longitudinal edges by means of circular strips 13 and screws 14 which pass through said strips, piercing the opposite sides of said ring, as will be readily understood. The periphery or tread portion of the ring 1 is concave in order that the covering 12 may be made heavier or thicker at this location, thus conducing to greater resiliency in the construction. The space intervening the adjacent sides of the rings 1 and 2 is closed by circular plates 15 the outer edges of which are rigidly secured to the ring 1 by means of the strips 13 and screws 14, said plates 15 serving to effectually close the joint between said rings and to exclude the dust and dirt from the interior of the tire. The inner surface of the ring 2 is formed conical or tapering in order to adapt the same to fit the felly of the ordinary wheel constructed for the accommodation of the conventional demountable rim. However, it is understood that this tire may be secured upon the wheel in any manner desired.

In Figs. 3 and 4 is illustrated a slightly modified form of construction. In this form, the helical springs 7 are dispensed with and substantially U-shaped leaf springs 7' employed in lieu thereof. The central portions of the springs 7' are secured to the rings 1 and 2 by means of screws 16, the extremities of said springs being provided with elongated slots 17 for slidable engagement with lugs 18 projecting from said rings, the lugs 8 of the preferred construction being dispensed with. The remainder of the construction of the form shown in Figs. 3 and 4 is identical with that above described, and so that a repetition will not be made, like parts in the two constructions being indicated by like numerals of reference.

A tire of the construction set forth will be found to possess great resilience together with great strength and durability. This tire is adapted to serve in the same capacity as a pneumatic tire, and may be manufactured at a cost much less than the cost of manufacturing pneumatic tires as now constructed.

While we have illustrated and described the preferred forms of construction for carrying our invention into effect, these are capable of variations and modifications without departing from the spirit of the invention. We, therefore, do not wish to be limited to the exact details of construction set forth, but desire to avail ourselves of such variations and modifications as come within the scope of the appended claim.

Having described our invention, what we claim as new and desire to secure by Letters Patent, is:

A resilient tire for vehicle wheels comprising an outer integral ring; an inner ring disposed concentrically in said outer ring and made up of a plurality of parts, each part having an ear at each of its ends secured to the ear of its next adjacent part, a portion of the engaging surfaces between adjacent ears being beveled and the remaining portion of such surfaces being square; and resilient connections between such outer ring and said inner ring yieldingly holding such rings concentric.

In testimony whereof we have signed our names to this specification in the presence of two subscribing witnesses.

OTTO ERICKSON.
OLOF G. SUNDEN.

Witnesses:
 JOSHUA R. H. POTTS,
 BRAYTON G. RICHARDS.